US007087838B2

(12) United States Patent
Ferderer et al.

(10) Patent No.: US 7,087,838 B2
(45) Date of Patent: Aug. 8, 2006

(54) CABLE SEALING FOR A PLUG CONNECTOR

(75) Inventors: Albert Ferderer, Espelkamp (DE); Heiko Meier, Rahden (DE)

(73) Assignee: Harting Electric GmbH & Co. KG (DE)

( * ) Notice: Subject to any disclaimer, the term of this patent is extended or adjusted under 35 U.S.C. 154(b) by 0 days.

(21) Appl. No.: 10/899,796

(22) Filed: Jul. 27, 2004

(65) Prior Publication Data

US 2005/0026489 A1 Feb. 3, 2005

(30) Foreign Application Priority Data

Jul. 29, 2003 (DE) ................................ 103 34 518

(51) Int. Cl.
*H02G 15/04* (2006.01)

(52) U.S. Cl. ................................ 174/65 SS; 174/65 G; 174/153 G; 174/65 R; 439/271; 277/314; 277/602

(58) Field of Classification Search .............. 174/65 R, 174/65 SS, 135, 152 R, 153 R, 50, 152 G, 174/153 G, 65 G; 16/2.1, 2.2; 248/56; 439/275, 439/271, 527, 535, 604, 548, 549, 556, 559, 439/586, 587; 277/314, 602, 603, 608, 625, 277/915

See application file for complete search history.

(56) References Cited

U.S. PATENT DOCUMENTS

| | | | | |
|---|---|---|---|---|
| 2,813,692 | A * | 11/1957 | Bremer et al. | 248/56 |
| 4,713,021 | A | 12/1987 | Kobler | 439/272 |
| 5,266,045 | A * | 11/1993 | Yamamoto et al. | 439/275 |
| 6,323,433 | B1 * | 11/2001 | Mahaney et al. | 174/152 G |
| 6,494,731 | B1 * | 12/2002 | Suzuki | 439/275 |
| 6,527,302 | B1 * | 3/2003 | Gault et al. | 174/50 |
| 6,551,124 | B1 | 4/2003 | Gossmann | 439/411 |
| 6,692,301 | B1 * | 2/2004 | Okayasu et al. | 439/587 |
| 6,787,701 | B1 * | 9/2004 | Yasuda et al. | 174/65 G |
| 6,854,996 | B1 * | 2/2005 | Yaworski et al. | 439/276 |

FOREIGN PATENT DOCUMENTS

| | | |
|---|---|---|
| CA | 2096710 | 11/1994 |
| DE | 29604978 | 3/1996 |
| DE | 29612407 | 7/1996 |

* cited by examiner

*Primary Examiner*—Angel R. Estrada
(74) *Attorney, Agent, or Firm*—Hayes Soloway P.C.

(57) ABSTRACT

A plug connector includes a housing, a through-opening for a cable, and a seal adapted to seal in the area of the through-opening. A pressure plate is provided for compressing the seal between the pressure plate and a mating face in the housing, wherby part of the seal is pressed inwards in radial direction with respect to the through-opening.

14 Claims, 3 Drawing Sheets

CABLE SEALING FOR A PLUG CONNECTOR

TECHNICAL FIELD

The invention relates to a plug connector comprising a housing, a through-opening for a cable, and a seal adapted to seal in the area of the through-opening.

BACKGROUND OF THE INVENTION

The seal has the function to seal the cable at its passage into the interior of the housing, so that the ingress of humidity and dirt into the housing is prevented. A variety of constructions is known from prior art in the context of sealing around a cable.

It is the object of the invention to provide a plug connector including a seal which seals particularly well in the area of the cable passage and also allows to integrate several cables in one cable sealing.

SUMMARY OF THE INVENTION

According to the invention plug connector includes a housing, a through-opening for a cable, and a seal adapted to seal off in the area of the through-opening. A pressure plate is provided by means of which the seal can be compressed between the pressure plate and a mating face in the housing. Thereby part of the seal is pressed inwards in radial direction with respect to the through-opening In such arrangement the pressure plate fulfils two functions. On the one hand it urges the seal firmly against the housing, in order to ensure the sealing between the seal and the housing. On the other hand the pressure plate causes the seal being deformed due to which the seal rests firmly against the cable and establishes a good sealing effect at this place.

It is preferred that a compression face is provided by means of which the seal is urged radially inwards in the area of the through-opening. Such compression face can be arranged on the pressure plate and/or on the housing, in particular in the area of the through-opening for the cable, so that the seal can be effectively and directly pressed against the cable. Here it is of particular advantage if the compression face is constituted by a conical constriction in the area of the through-opening and the seal has a cylindrical projection which is compressed radially inwards at least in the area of its free end by the compression face. A wedging effect is produced in this way, by means of which a movement of the pressure plate in axial direction with respect to the through-opening brings about a deformation and displacement of the cylindrical projection of the seal in radial direction. This makes it possible to uniformly urge the seal radially inwards with a good mechanical efficiency, so that it rests tightly against the cable.

Screws can be used for fastening the pressure plate to the housing, so that in actual practice the pressure plate can be screwed in on the spot with low expenditure. The screws are preferably arranged such that the seal is uniformly compressed between the pressure plate and the housing.

DETAILED DESCRIPTION OF THE PREFERRED EMBODIMENT

Figure 1:
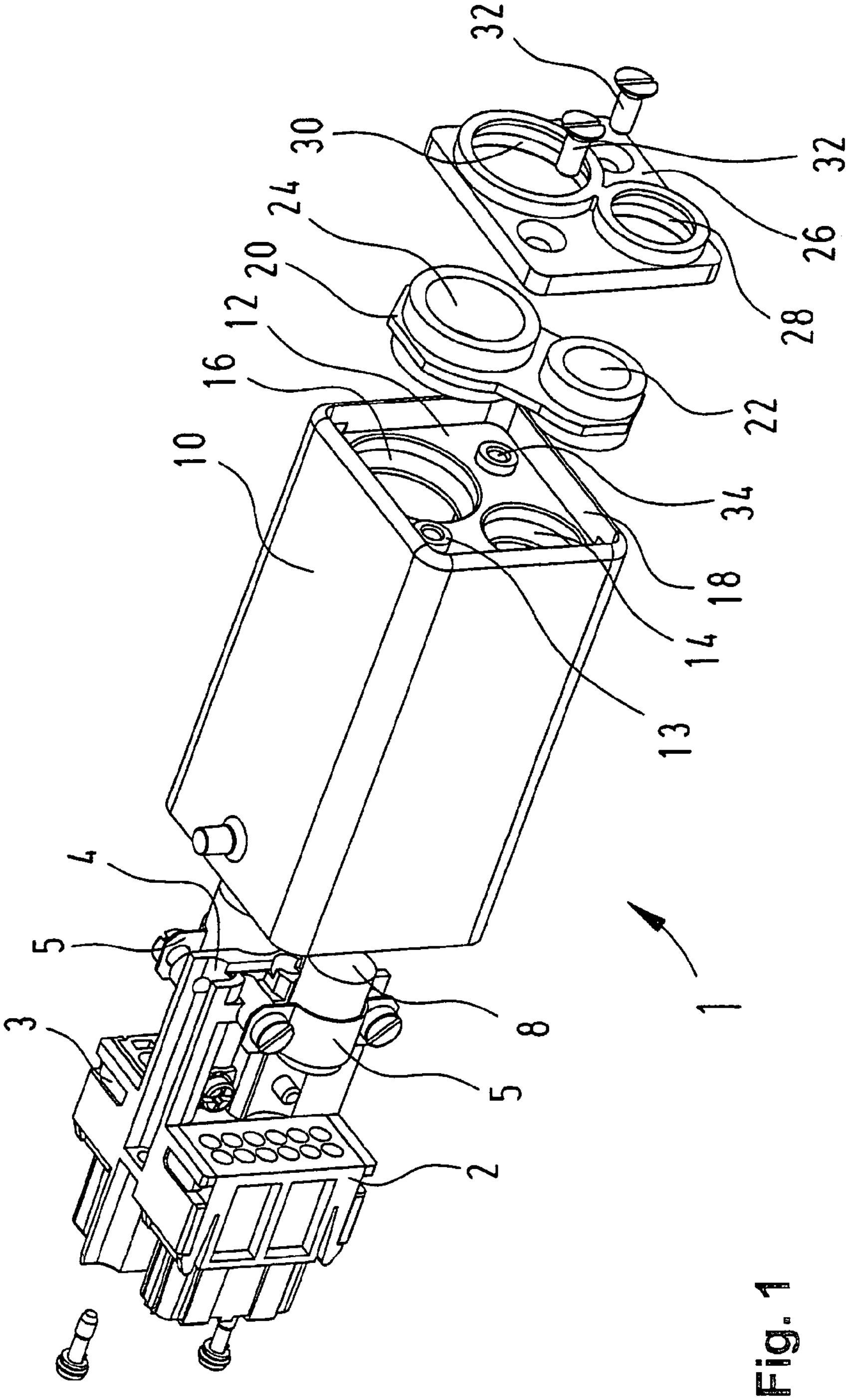
FIG. 1 shows in a perspective exploded view a plug connector according to the invention.
Figure 2:
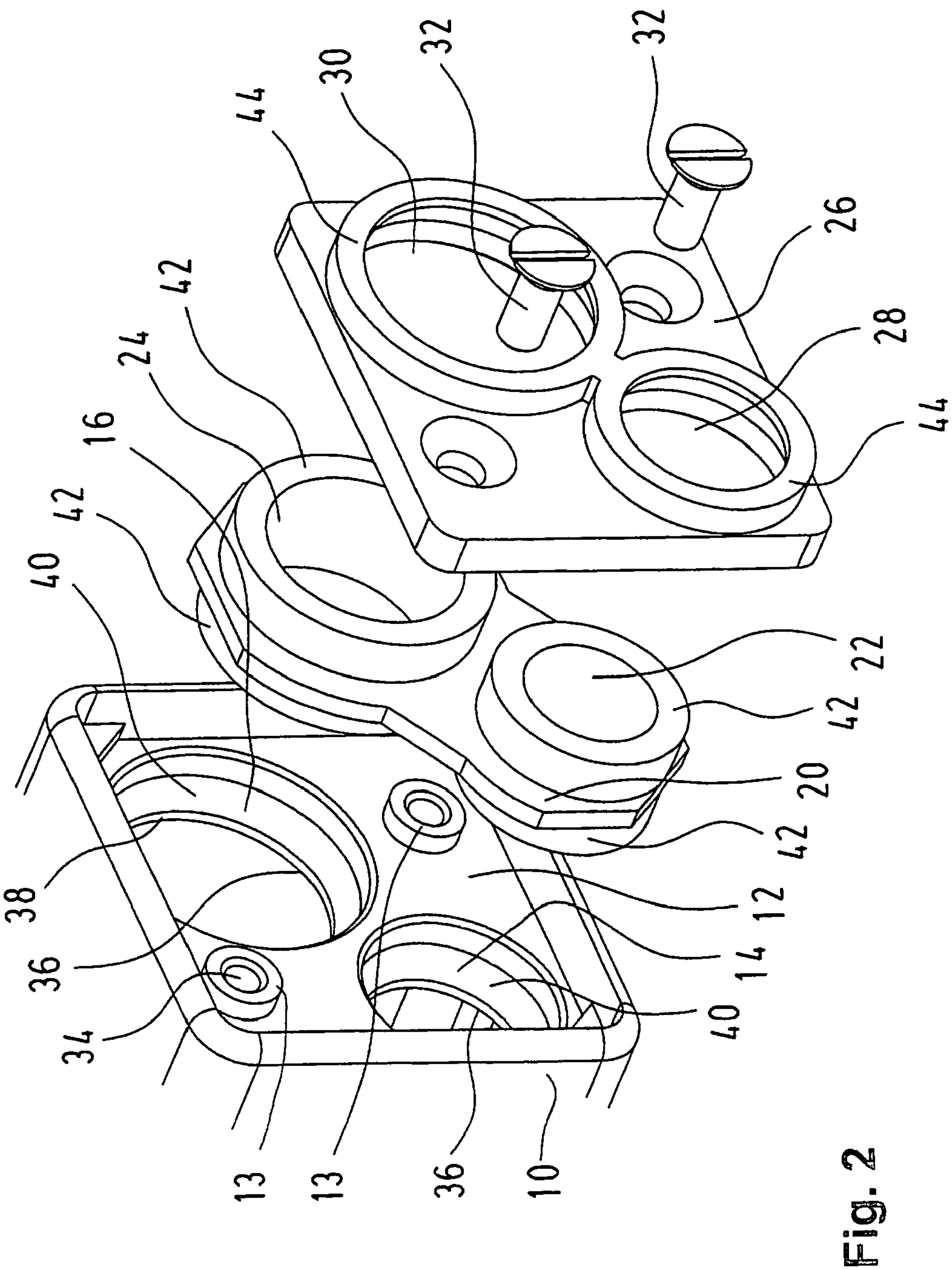
FIG. 2 shows on an enlarged scale that area of the plug connector which has the through-openings for the cable.

FIG. 1 shows a plug connector 1 including a first plug module 2 and a second plug module 3 which are arranged on opposite sides of a dividing wall 4. Each plug module 2, 3 has a band clamp 5 associated to it, in which an outlined cable 8 is clamped, the conductors of which can be guided to the corresponding plug module 2, 3. Each band clamp 5 serves both for relieving strain and making contact with a shielding surrounding the cable.

The plug modules 2, 3 are arranged on opposite sides of the dividing wall 4 in the interior of a housing 10. The dividing wall 4 and the housing 10 either consist of metal or of metallized plastics; in this way a shielding against electromagnetic interference is obtained, and due to the dividing wall 4 a high stereo separation between the two plug modules 2, 3.

In the embodiment which is shown in the Figures, the housing 10 has a rectangular cross-section and an end wall 12 on the side facing away from the plug modules 2, 3; formed in this end wall are a first through-opening 14 for a cable to be connected with the first plug module 2 as well as a second through-opening 16 for a cable to be connected with the second plug module 3. The end wall 12 is arranged so as to be slightly set back, so that a surrounding skirt 18 is formed which projects from the end wall 12. A stopping face 13 is provided on the end wall.

In the space enclosed by the skirt 18 there is arranged a seal 20 having a first through-opening 22 and a second through-opening 24. The two seal through-openings 22, 24 are coaxial with the two housing through-openings 14, 16. The seal 20 is made from an elastomer, in particular from soft rubber.

At the side of the seal 20 facing away from the end wall 12 there is arranged a pressure plate 26 which likewise is situated in the space enclosed by the skirt 18. The pressure plate 26 is made from plastics or metal and has a first through-opening 28 and a second through-opening 30. The first pressure plate through-opening 28 is coaxially aligned with the first seal through-opening 22 and the first housing through-opening 14. The second pressure plate through-opening 30 is coaxially aligned with the second seal through-opening 24 and the second housing through-opening 16. For fastening the pressure plate 26 to the housing 10 there are provided two screws 32 which are screwed into two threaded openings 34 in the end wall 12.

The housing through-openings 14, 16 are each formed within a cylindrical projection 36 (see in particular FIG. 3), which extends from the end wall 12 into the interior of the housing 10. On its half facing the interior of the housing 10, the cylindrical projection 36 is provided with a conical constriction 38 delimited by a compression face 40 towards the through-opening 14, 16. Thus, the compression face 40 has a shape that is complementary with a truncated cone.

Around each of the through-openings 22, 24 the seal 20 has a cylindrical projection 42, with one projection 42 being provided on each side of the body of the seal 20. In other words, the seal 20 has a structure which is mirror-inverted with respect to a plane identical with the center plane of the body of the seal 20 and perpendicular to the axes of the two through-openings 22, 24. The outer diameter of the cylindrical projections 42 of the seal 20 corresponds approximately to the maximum diameter of the housing through-openings 14, 16.

The pressure plate 26 likewise is provided with a cylindrical projection 44 around its through-openings 28, 30. Just like the projections 36 in the end wall 12 of the housing 10, each pressure plate projection 44 is provided with a conical constriction 46 which is delimited on its inside by a compression face 48.

The maximum diameter of the housing through-openings 14, 16 as well as of the pressure plate through-openings 28, 30 is approximately identical with the diameter of the cylindrical projections 42 of the seal 20. The minimum diameter of the housing through-openings 14, 16 as well as of the pressure plate through-openings 28, 30, i.e. the smallest diameter in the area of the constrictions 38, 46, however, is smaller than the outer diameter of the seal projections 42.

During assembly of the plug connector the cables to be connected are usually first pushed through the through-openings in the pressure plate 26, the through-openings in the seal 20 and the through-openings 14, 16 in the end wall 12 of the housing 10 and connected with the two plug modules 2, 3 which are mounted in dedicated support means at both sides of the dividing wall 4. Subsequently the two plug modules 2, 3 including the dividing wall 4 are pushed into the housing 10.

Figure 3:
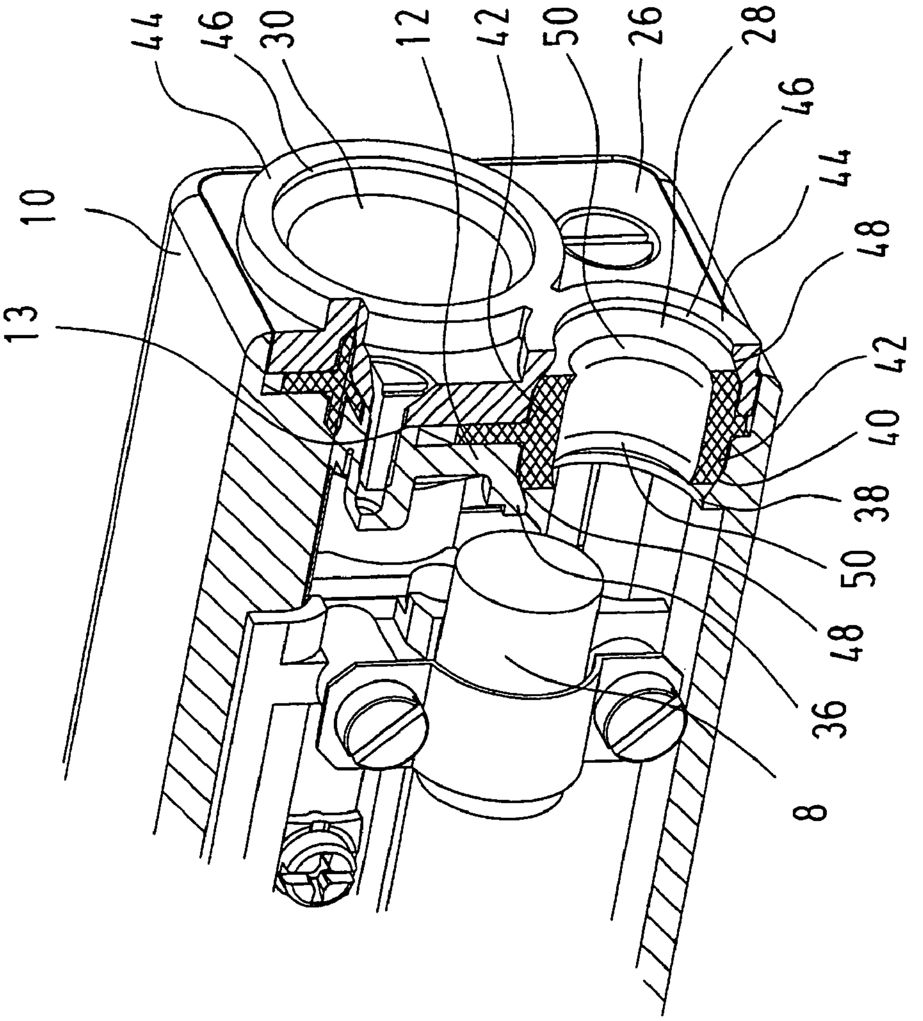
FIG. 3 shows in a perspective, partially sectional view that end of the plug connector which is provided with the through-openings, with the seal installed.

The through-openings for the cables are sealed by arranging the seal 20 in the space enclosed by the skirt 18 and placing the pressure plate 26 on the seal. Then the pressure plate 26 is urged against the end wall 12 by means of the screws 32, whereby the seal 20 is compressed between the pressure plate 26 and the end wall 12 acting as a mating face. In the process, the cylindrical projections 42 of the seal 20 are pushed into the conical constrictions 38, 46 in the end wall 12 of housing 10 and pressure plate 26, respectively, whereby the seal is compressed radially inwards in this area. In FIG. 3 there are to be seen two compressed portions 50 of the seal 20, which are formed on the entry and exit ends of the seal through-opening. In this area the seal 20 firmly rests against the respective cable, so that a reliable sealing with a high IP protection class is achieved. The seal projection 42 also serves with its double-sided compressed portions 50 as a cable protection sleeve.

The pressure plate 26 provides for a uniform acting upon the seal 20, so that a uniform and with this a very good sealing is achieved. Due to the advantageous arrangement of the two screws 32 lying diagonally opposite each other, only very few screws are required to make a uniform connection between the pressure plate 26 and the end wall 12 of the housing. An excessive compression of the seal is prevented by the stopping face 13 at which the pressure plate 26 can come to rest and which ensures a minimum distance of the pressure plate from the end wall. It is particularly emphasized that it would be possible to seal off several cables in the area of exiting from the housing.

The invention claimed is:

1. A plug connector comprising a housing, a through-opening with a central axis for a cable, a seal for sealing an area of said through-opening, and a pressure plate for compressing said seal between said pressure plate and a mating face in said housing, whereby part of said seal is pressed inwards in radial direction with respect to said through-opening, said seal having a body and cylindrical projections which are arranged on each side of said body and associated with said through-opening, said seal being mirror-inverted with respect to a plane which is identical with a center plane of said body and perpendicular to said central axis of said through-opening.

2. The plug connector according to claim 1, wherein a compression face is provided for pressing said seal radially inwards in said area of said through-opening.

3. The plug connector according to claim 2, wherein said compression face is arranged on said pressure plate.

4. The plug connector according to claim 3, wherein said pressure plate is provided with a through-opening for said cable, and said compression face is arranged on a rim of said through-opening.

5. The plug connector according to claim 2, wherein said compression face is arranged on said housing.

6. The plug connector according to claim 5, wherein said compression face is arranged on a rim of said through-opening in said housing.

7. The plug connector according to claim 2, wherein said compression face is constituted by a conical constriction in said area of said through-opening.

8. The plug connector according to claim 7, wherein said seal has a cylindrical projection which is compressed radially inwards at least in an area of its free end by said compression face.

9. The plug connector according to claim 3, wherein said seal and said compression face are configured so as to be mirror-inverted with respect to a center plane of said seal, so that said seal is pressed radially inwards at two portions axially spaced from each other.

10. The plug connector according to claim 1, wherein said pressure plate is clamped against said housing through a fastener.

11. The plug connector according to claim 10, wherein said fastener comprises at least one screw.

12. The plug connector according to claim 11, wherein two through-openings and two screws are provided, one of said screws being positioned on one side of a line constituted by said through-openings and the other of said screws being positioned on another side of this line.

13. The plug connector according to claim 1, wherein said seal is made from an elastomer.

14. The plug connector according to claim 1, wherein a stopping face is provided for said pressure plate for limiting a maximum admissible compression of said seal.

* * * * *